US012186886B2

(12) United States Patent
Sullivan

(10) Patent No.: US 12,186,886 B2
(45) Date of Patent: Jan. 7, 2025

(54) WELDING ROBOT FOR REPAIRING A SURFACE DEFECT IN A PRESS PLATEN SURFACE WHILE PLACED IN A PRESS AT OPERATING TEMPERATURE

(71) Applicant: Joel Sullivan, Porters Lake (CA)

(72) Inventor: Joel Sullivan, Porters Lake (CA)

( * ) Notice: Subject to any disclaimer, the term of this patent is extended or adjusted under 35 U.S.C. 154(b) by 932 days.

(21) Appl. No.: 17/287,328

(22) PCT Filed: Oct. 17, 2019

(86) PCT No.: PCT/CA2019/000147
§ 371 (c)(1),
(2) Date: Apr. 21, 2021

(87) PCT Pub. No.: WO2020/082156
PCT Pub. Date: Apr. 30, 2020

(65) Prior Publication Data
US 2021/0354308 A1    Nov. 18, 2021

(30) Foreign Application Priority Data

Oct. 26, 2018 (CA) ................................ CA 3022263
Mar. 6, 2019 (CA) ................................ CA 3035995

(51) Int. Cl.
*B25J 11/00* (2006.01)
*B23K 37/02* (2006.01)
(Continued)

(52) U.S. Cl.
CPC ....... *B25J 11/0065* (2013.01); *B23K 37/0282* (2013.01); *B23P 6/00* (2013.01);
(Continued)

(58) Field of Classification Search
CPC ...... B25J 11/0065; B25J 5/007; B25J 9/0084; B25J 18/025; B25J 19/0054; B25J 19/023;
(Continued)

(56) References Cited

U.S. PATENT DOCUMENTS 6,167,328 A * 12/2000 Takaoka ................. B25J 9/1671
                                                                700/250
9,049,433 B1 * 6/2015 Prince ..................... G06T 7/001
(Continued)

FOREIGN PATENT DOCUMENTS

CN        206733016 U    12/2017
CN        206925519 U    1/2018
(Continued)

OTHER PUBLICATIONS

Sullivan, Joel, "Welding Robot Demonstration", 13 pages, YouTube [online][video], Aug. 18, 2018, retrieved on May 28, 2024 from Internet: < https://www.youtube.com/watch?v=YOt0LxMMp2M> (Year: 2018).*

(Continued)

*Primary Examiner* — Alicia M. Choi
(74) *Attorney, Agent, or Firm* — Bonini IP Law, LLC; Frank J. Bonini, Jr.

(57) ABSTRACT

A welding robot is provided. The welding robot is adapted for operating in the space between an upper and a lower platen of a press and comprises a support frame. A welding tool is movable mounted to the support frame. A grinding tool is movable mounted to the support frame. At least a camera is adapted for capturing a view of a working area. A processor is adapted for executing executable commands stored in a storage medium connected thereto. The processor when executing the commands identifies defects on a surface of one of the upper and the lower platen based on image (Continued)

data received from the at least a camera and controls the welding tool and the grinding tool in dependence on the image data. The processor receives data indicative of the repair area, automatically determines toolpath data for welding and grinding in dependence upon the data indicative of a repair area, and generates and provides control data for controlling the welding tool and the grinding tool in dependence upon the toolpath data.

18 Claims, 17 Drawing Sheets

(51) Int. Cl.
*B23P 6/00* (2006.01)
*B25J 5/00* (2006.01)
*B25J 9/00* (2006.01)
*B25J 18/02* (2006.01)
*B25J 19/00* (2006.01)
*B25J 19/02* (2006.01)
*B25J 19/04* (2006.01)
*G05B 19/19* (2006.01)

(52) U.S. Cl.
CPC .............. *B25J 5/007* (2013.01); *B25J 9/0084* (2013.01); *B25J 18/025* (2013.01); *B25J 19/0054* (2013.01); *B25J 19/023* (2013.01); *B25J 19/04* (2013.01); *G05B 19/19* (2013.01); *G05B 2219/45104* (2013.01)

(58) Field of Classification Search
CPC .......... B25J 19/04; B25J 9/0087; B25J 9/045; B23K 37/0282; B23K 9/04; B23K 31/12; B23K 9/0956; B23K 37/02; B23K 11/318; B23K 11/11; B23K 11/115; B23K 11/314; B23K 37/003; B23P 6/00; G05B 19/19; G05B 2219/45104
See application file for complete search history.

(56) References Cited

U.S. PATENT DOCUMENTS

| | | | |
|---|---|---|---|
| 9,662,782 B2 | 5/2017 | Teak-Kun et al. | |
| 11,338,431 B2* | 5/2022 | Ono | B25J 18/007 |
| 2005/0168178 A1* | 8/2005 | Toyozawa | G05B 19/19 |
| | | | 318/68 |
| 2013/0032578 A1* | 2/2013 | Trapp | B23K 11/004 |
| | | | 29/402.13 |
| 2013/0112367 A1* | 5/2013 | Kooken | B23K 9/1006 |
| | | | 165/11.1 |
| 2018/0065211 A1* | 3/2018 | Arimoto | G06T 7/001 |
| 2018/0361595 A1* | 12/2018 | Troy | B25J 9/162 |
| 2019/0328354 A1* | 10/2019 | Xu | B06B 1/0685 |

FOREIGN PATENT DOCUMENTS

| | | | |
|---|---|---|---|
| CN | 108000799 A | * | 5/2018 |
| CN | 108942079 A | * | 12/2018 |
| KR | 20010003879 A | * | 1/2001 |
| KR | 20130022458 A | | 3/2013 |

OTHER PUBLICATIONS

Sullivan, Joel, "Welding Robot Demonstration", Youtube [online][video], Aug. 17, 2018, retrieved on Apr. 19, 2021 from: < https://www.youtube.com/watch?v=YOt0LxMMp2M >.

* cited by examiner

WELDING ROBOT FOR REPAIRING A SURFACE DEFECT IN A PRESS PLATEN SURFACE WHILE PLACED IN A PRESS AT OPERATING TEMPERATURE

FIELD OF THE INVENTION

The present invention relates to welding robots, and more particularly to a welding robot and control thereof that is adapted for repairing a surface defect in a press platen surface while placed in a press at operating temperature.

BACKGROUND OF THE INVENTION

Present day presses for manufacturing boards or panels such as, for example, Oriented Strand Boards (OSB)s, plywood boards, or Medium Density Fiber (MDF) boards, are pressing the board material between an upper and a lower press platen, with the platens typically being flat carbon steel plates, at an operating temperature of approximately 220° C. Due to the large mass of the press and the platens, cooling of such presses to room temperature for, for example, maintenance or repair, requires a substantial amount of time, typically several days, resulting in a substantial loss for the manufacturer during the time the press sits idle.

Foreign hard objects in the board material for pressing such as, for example, lost machine parts or tools from previous processing steps of the board material, cause defects surface dents in the platen surfaces, resulting in defective products after pressing. Typically, if severe defects require the products to be rejected, boards will be discarded until the next cold shutdown cycle (typically one cold shutdown is scheduled annually). The press must be shut down for several days as described herein above.

Furthermore, when the press is in an open position the gap between the upper and the lower platen may vary but is typically between 10.5"-12" depending on press design, thus requiring a welder to crawl between the platens and repair—weld and grind—the defective platen surface area in a very confined space.

It is desirable to provide a welding robot that enables detection and repair of a defective platen surface area.

It is also desirable to provide a welding robot that is adapted for operating in the confined space between the upper and lower platen.

It is also desirable to provide a welding robot that is adapted for repairing defective platen surface areas of the upper and lower platen.

It is also desirable to provide a welding robot that is adapted for operating at the operating temperature of the press.

It is also desirable to provide a welding robot that is capable of automatically repairing a defective platen surface area.

SUMMARY OF THE INVENTION

Accordingly, one object of the present invention is to provide a welding robot that enables detection and repair of a defective platen surface area.

Another object of the present invention is to provide a welding robot that is adapted for operating in the confined space between the upper and lower platen.

Another object of the present invention is to provide a welding robot that is adapted for repairing defective platen surface areas of the upper and lower platen.

Another object of the present invention is to provide a welding robot that is adapted for operating at the operating temperature of the press.

Another object of the present invention is to provide a welding robot that is capable of automatically repairing a defective platen surface area.

According to one aspect of the present invention, there is provided a welding robot. The welding robot is adapted for operating in the space between an upper and a lower platen of a press and comprises a support frame. A welding tool is movable mounted to the support frame. A grinding tool is movable mounted to the support frame. At least a camera is adapted for capturing a view of a working area. A processor is adapted for executing executable commands stored in a storage medium connected thereto. The processor when executing the commands uses identification of defects on a surface of one of the upper and the lower platen based on image data received from the at least a camera and controls the welding tool and the grinding tool in dependence on the image data.

According to the aspect of the present invention, there is provided a method for repairing a defect in a surface of one of an upper and a lower platen of a press. A welding robot adapted for operating in the space between the upper and the lower platen is provided. Using at least a camera a view of a working area is captured. Using a processor adapted for executing executable commands stored in a storage medium connected thereto. The processor when executing the commands identifies the defect based on image data received from the at least a camera and repairs the defect by controlling a welding tool and a grinding tool of the welding robot in dependence on the image data.

According to the aspect of the present invention, there is provided a method for repairing a defect in a surface of one of an upper and a lower platen of a press. A welding robot adapted for operating in the space between the upper and the lower platen is provided. Using at least a camera a view of a working area is captured. Using a processor adapted for executing executable commands stored in a storage medium connected thereto. The processor when executing the commands identifies the defect based on image data received from the at least a camera and repairs the defect by controlling a welding tool and a grinding tool of the welding robot in dependence on the image data. The processor receives data indicative of the repair area, automatically determines toolpath data for welding and grinding in dependence upon the data indicative of a repair area, and generates and provides control data for controlling the welding tool and the grinding tool in dependence upon the toolpath data.

The advantage of the present invention is that it provides a welding robot that enables detection and repair of a defective platen surface area.

A further advantage of the present invention is that it provides a welding robot that is adapted for operating in the confined space between the upper and lower platen.

A further advantage of the present invention is that it provides a welding robot that is adapted for repairing defective platen surface areas of the upper and lower platen.

A further advantage of the present invention is that it provides a welding robot that is adapted for operating at the operating temperature of the press.

A further advantage of the present invention is that it provides a welding robot that is capable of automatically repairing a defective platen surface area.

BRIEF DESCRIPTION OF THE DRAWINGS

A preferred embodiment of the present invention is described below with reference to the accompanying drawings, in which:

FIGS. 6a to 6e are simplified block diagrams illustrating software components for controlling the welding robot according to the preferred embodiment of the invention.

DESCRIPTION OF THE PREFERRED EMBODIMENT

Figure 1A:
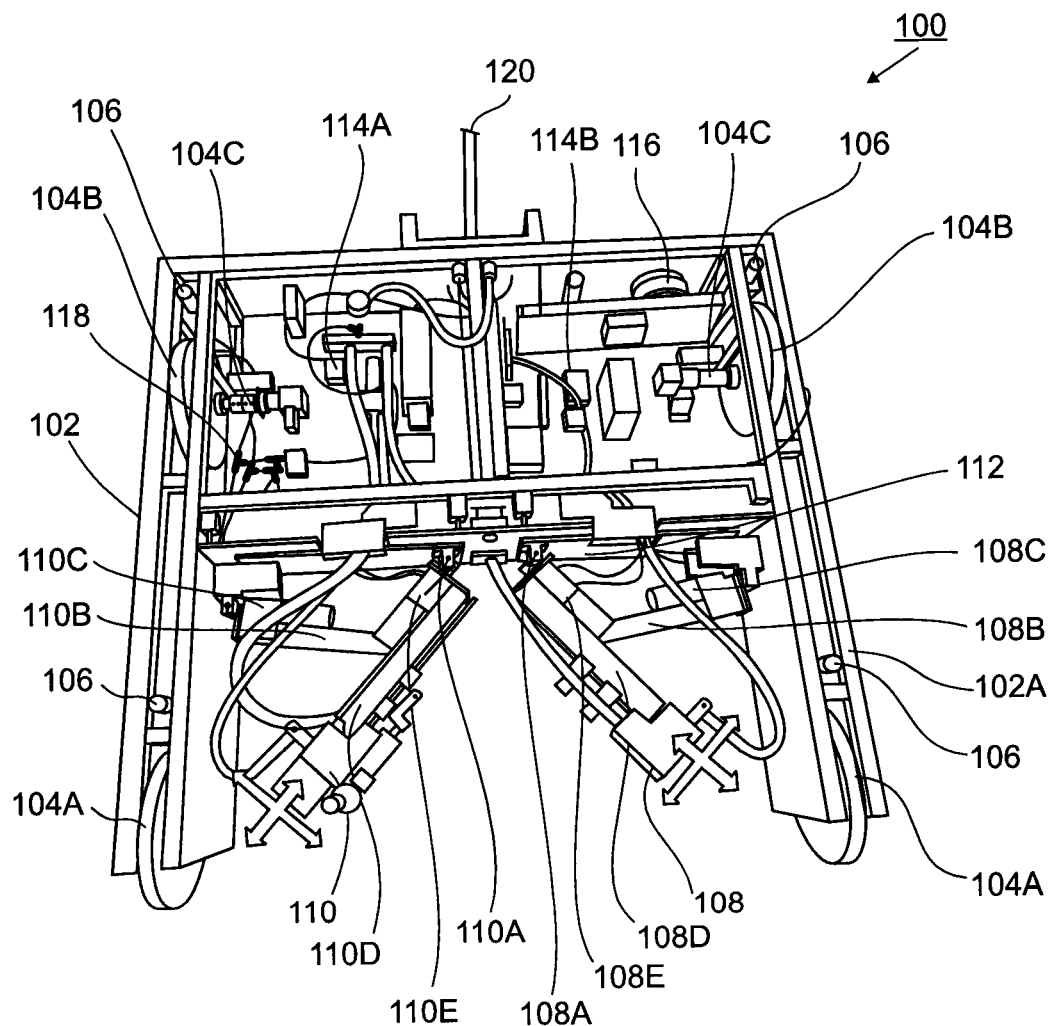
FIGS. 1a and 1b are simplified block diagrams illustrating in a top perspective view and a front perspective view, respectively, a welding robot according to a preferred embodiment of the invention with a heat protecting cover.
Figure 1B:
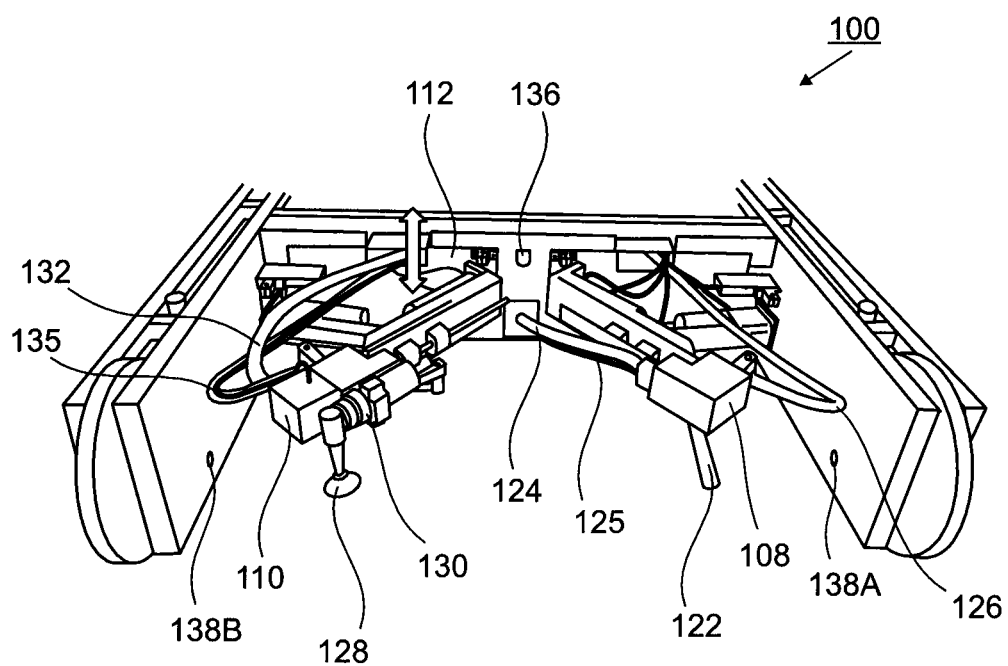

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Referring to FIGS. 1a to 1d a welding robot 100 according to a preferred embodiment of the invention is provided. The welding robot 100 comprises support frame 102 having left-hand and right-hand side front extension 102A protruding in a forward direction therefrom. A front wheel 104A is rotatably mounted to each of the front extensions 102A. Rear wheels 104B are rotatably mounted to a rear portion of the support frame 102. The front wheels 104A and the rear wheels 104B are mounted in a conventional manner using, for example, commercially available bearings. Each of the rear wheels 104B is driven by a respective wheel drives 104C, such as, for example, left and right stepper motors $210_L$, $210_R$, enabling independent drive operation of the rear wheels 104B for small steering corrections. Preferably, the support frame 102 is made of aluminum profiles using conventional aluminum fastening technology, but is not limited thereto. Further preferably, the wheels are made of aluminum since aluminum wheels have sufficient friction on the steel platens.

Navigation of the welding robot 100 is facilitated using forward-facing navigation camera 136, for example, a commercially available digital camera.

For illuminating the working area lights sources 138A and 138B such as, for example, conventional LED lights are disposed in the left-hand and right-hand side front extension 102A, respectively.

Riggers 106 are mounted to the support frame 102 in proximity to the wheels 104A, 104B. Each of the riggers 106 is telescopically extendable in an upward direction for securing the welding robot during welding and grinding, as will be described hereinbelow. The riggers 106 are of conventional design and are, for example, pneumatically operated using pressurized air supplied to the welding robot 100.

Welding arm 108 and grinding/camera arm 110 are disposed between the left-hand and right-hand side front extensions 102A with each being rotatable mounted in a conventional, for example, hinge type, manner at respective pivots 108A, 110A to front plate 112. Each of the arms 108, 110 is rotatably actuated using respective linear actuators 108B, 110B with each being driven by a respective servomotor 108C, 110C and gear mechanism. Furthermore, each of the arms 108, 110 is extendable/retractable using respective linear actuators 108D, 110D with each being driven by a respective servomotor 108E, 110E and gear mechanism. Preferably, the arms 108, 110 are custom made using conventional technology and commercially available components. This arrangement enables movement of each of the arms 108, 110 in a polar layout (angular movement and extension/retraction) as indicated by the block arrows in FIG. 1a. In order to enable vertical adjustment of the arms 108, 110, the front plate 112 is vertically movable mounted to the support frame in a conventional manner using, for example, guide rails, and is actuated using, preferably, two commercially available stepping motors $200_Z$, $202_Z$ for precise vertical adjustment, as indicated by the block arrow in FIG. 1b.

A commercially available GMAW mig welding nozzle and tip 122 is mounted to the distal end portion of the welding arm 108. Welding shield gas such as, for example, Blueshield 8 (mixture of 75% argon and 25% $CO_2$) and welding wire are provided to the welding head 122 via hose 124 while electrical power is provided via cable 125. The welding wire is provided from spool 116 placed in the rear of the support frame 102 and moved using a wire drive mechanism also placed in the rear of the support frame 102. Pressurized air is supplied via hose 126 to air nozzles placed in the welding arm 108 for cooling the same with the cooling air being directed in backward direction to ensure that the cooling air stream doesn't interact with the welding gas shield.

Figure 1C:
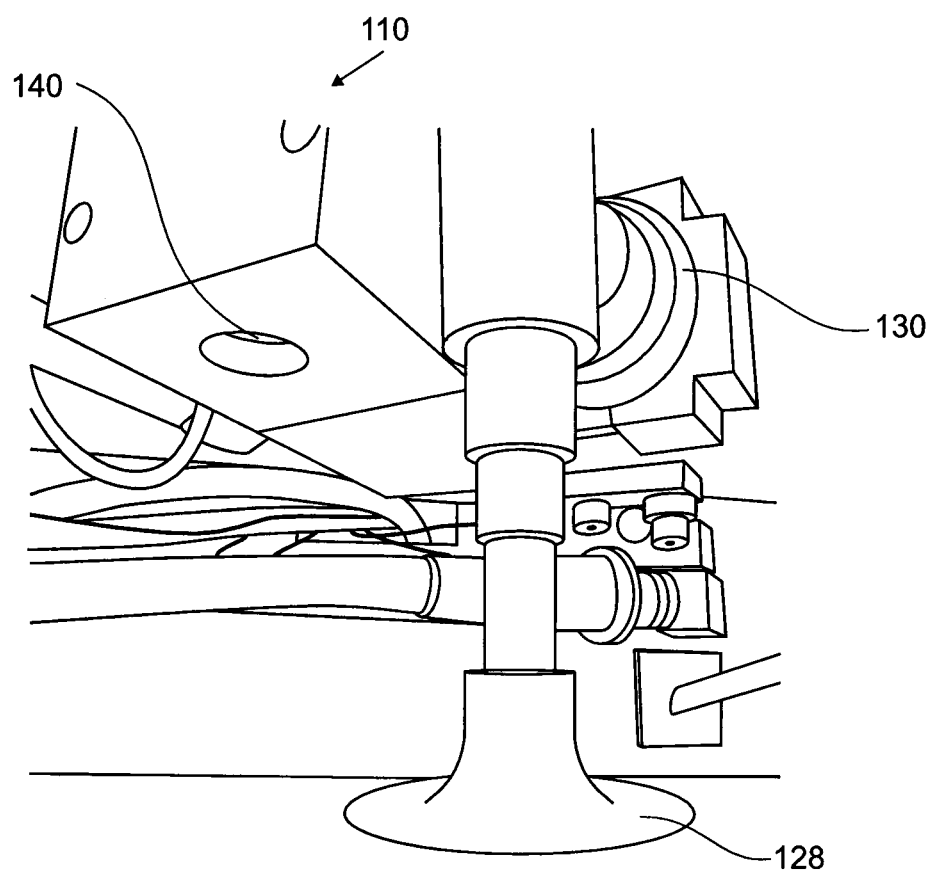
FIG. 1c is a simplified block diagram illustrating in a front perspective view a distal end portion of a grinding/camera arm of the welding robot according to the preferred embodiment of the invention.

A commercially available grinding tool 128 is mounted to the distal end portion of the grinding/camera arm 110 and is actuated using, for example, a pneumatic actuator 130 using pressurized air supplied via hose 132 with the exhaust being, preferably, directed backward. Downward facing inspection camera 140, for example, a commercially available digital camera is disposed inside the distal end portion of the grinding/camera arm 110, as illustrated in FIG. 1c. Pressurized air supplied via hose 135 is directed straight down around the inspection camera 140 forming an air curtain surrounding the camera 140 to protect the camera lens from grinding sparks and welding spatter as well as for cooling the same. The pressurized air is further supplied to air nozzles placed in the welding arm for cooling the same and to air nozzles oriented in a downward and forward direction for blowing dust from the platen surface in a forward direction.

Pressurized air is distributed throughout the machine—through tubes, cooling channels milled in the support frame 102, and hoses—for the various components of the welding robot 100 disposed inside the support frame 102, as well as the arms 108 and 110. Electromechanical control elements 114A and computer control elements 114B, which will be described hereinbelow, are disposed in the rear portion of the support frame 102 for controlling provision of pressurized air, welding shield gas, and electrical power received via umbilical 120. The computer control elements 114B, preferably, comprise a wireless communication link such as, for example, WiFi, for enabling remote control of the welding robot 100.

Figure 1D:
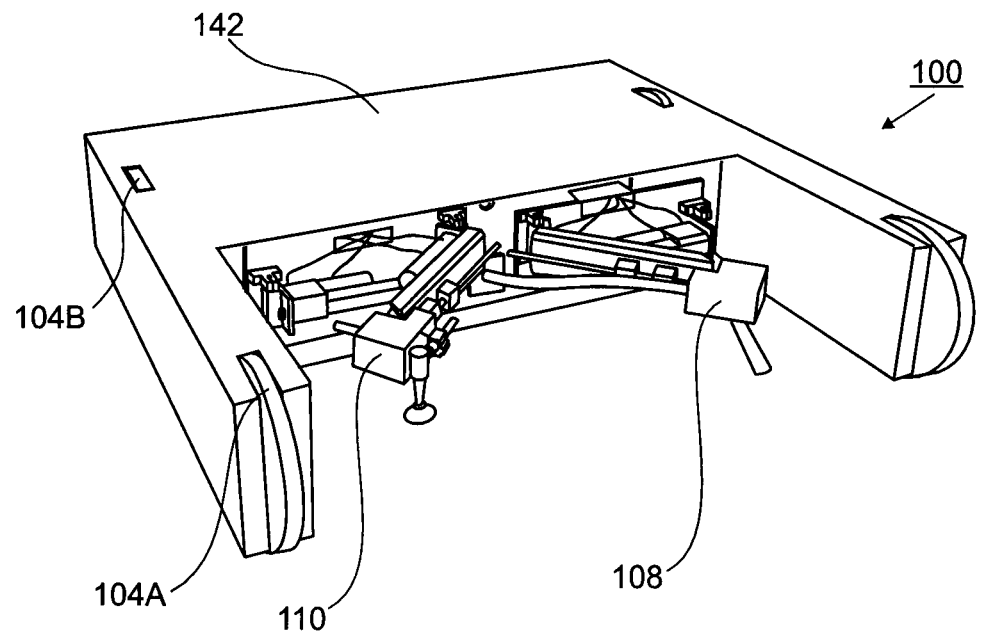
FIG. 1d is a simplified block diagram illustrating in a front perspective view the welding robot according to the preferred embodiment of the invention with the heat protecting cover.

For further heat protection, a heat protecting sheet material 142 such as, for example, ³⁄₁₆" thick PTFE (Teflon) sheet material is disposed on the outside of the support frame, as illustrated in FIG. 1d, enabling operation of the welding robot 100 in concert with the air cooling in a temperature range of 200° C.-250° C.

Figure 2A:
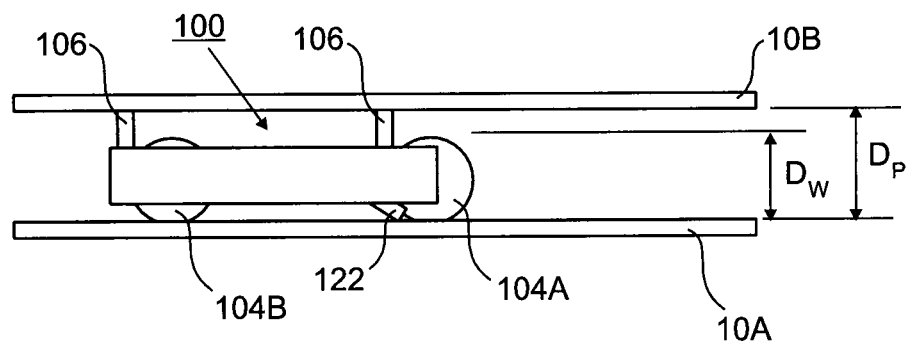
FIGS. 2a and 2b are simplified block diagrams illustrating in side views the welding robot according to the preferred embodiment of the invention placed between the platens of a press.
Figure 2B:
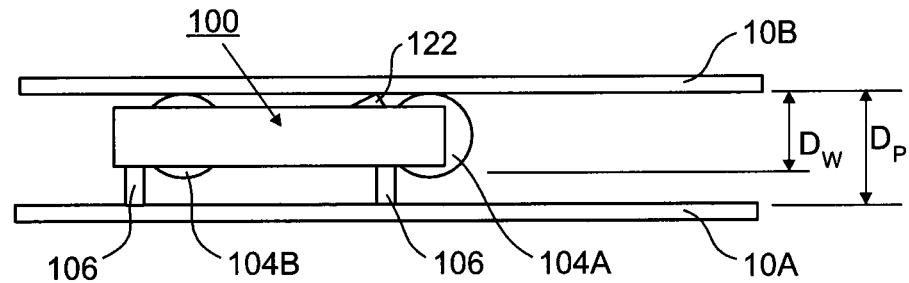

As illustrated in FIGS. 2a and 2b, the welding robot 100 is adapted for operating in the confined space between an upper platen 10B and a lower platen 10A of a press. Typically, when the press is in the open mode the distance $D_P$ between the upper platen 10B and the lower platen 10A is between 10.5" and 12". FIG. 2a illustrates the welding robot 100 in the position for repairing a defect in the lower platen 10A with the wheels 104A, 104B being in contact with the surface of the lower platen 10A and secured via the riggers 106 abutted against the surface of the upper platen 10B. FIG. 2b illustrates the welding robot 100 in an upside-down position for repairing a defect in the upper platen 10A with the wheels 104A, 104B being in contact with the surface of the upper platen 10B and secured via the riggers 106 abutted against the surface of the lower platen 10A. Preferably, the diameter $D_W$ of the wheels 104A, 104B is determined such that the difference to the distance $D_P$ is relatively small for most presses such as, for example, 9.5", thus minimizing the extension needed for abutting the riggers 106 as well as the distance for lifting the welding robot 100 when operated in the upside-down position.

Figure 3A:
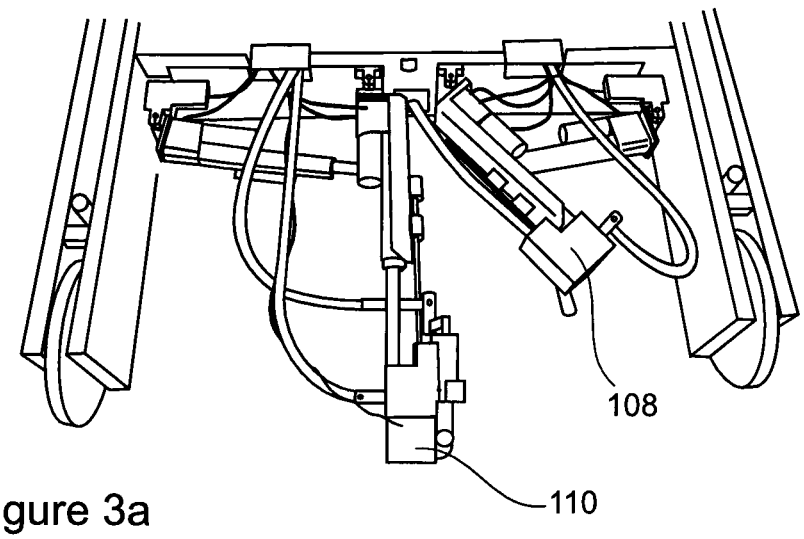
FIGS. 3a to 3f are simplified block diagrams illustrating in front perspective views the welding robot according to the preferred embodiment of the invention with the welding arm and the grinding/camera arm in different positions.
Figure 3B:
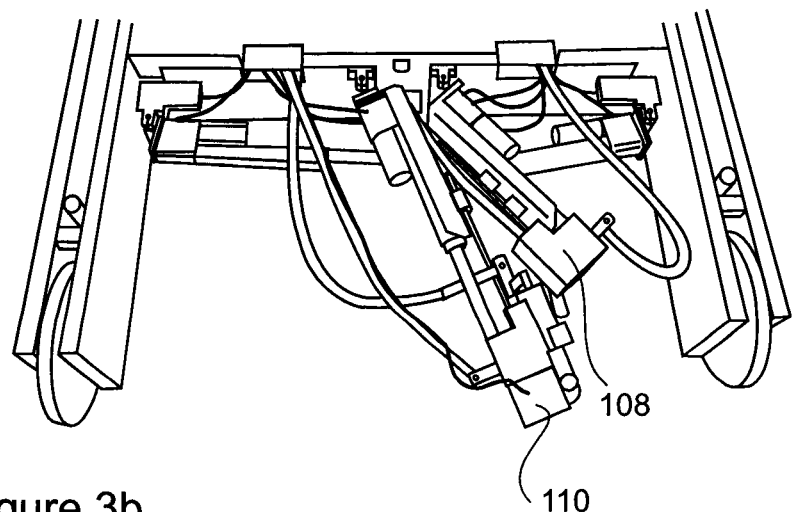
Figure 3C:
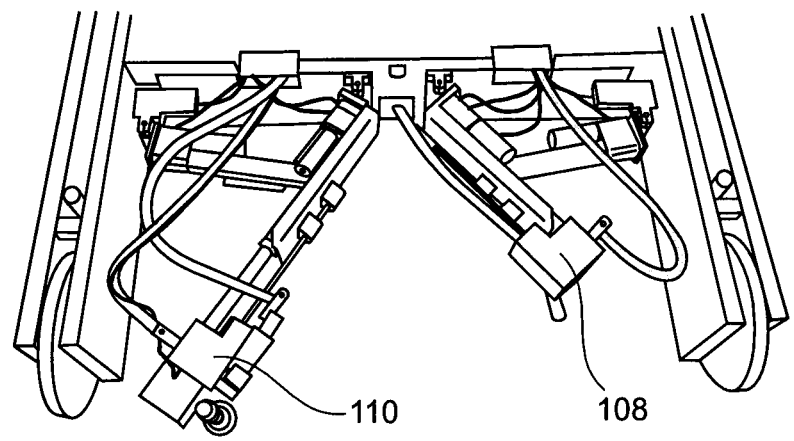
Figure 3D:
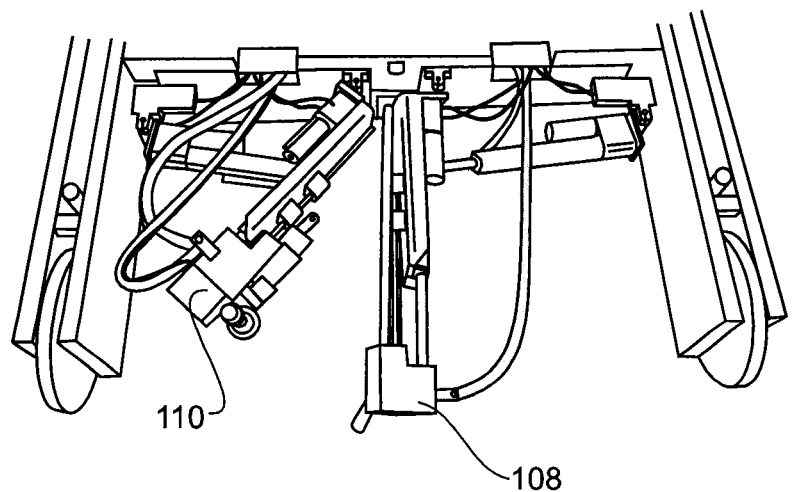
Figure 3E:
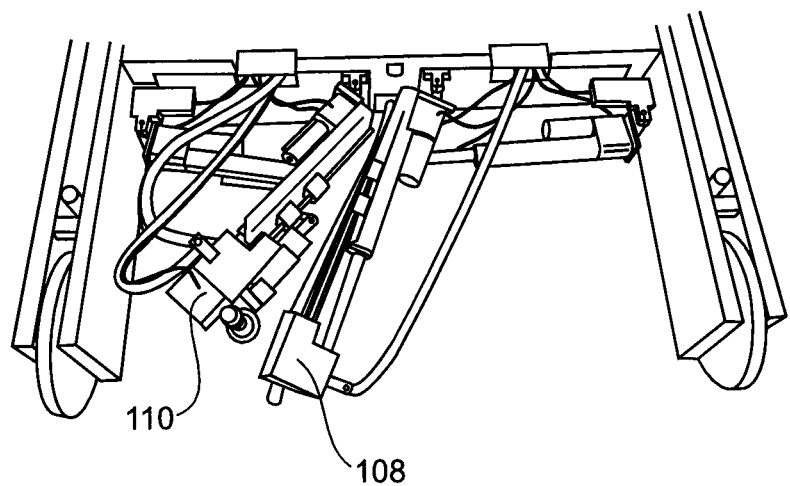
Figure 3F:
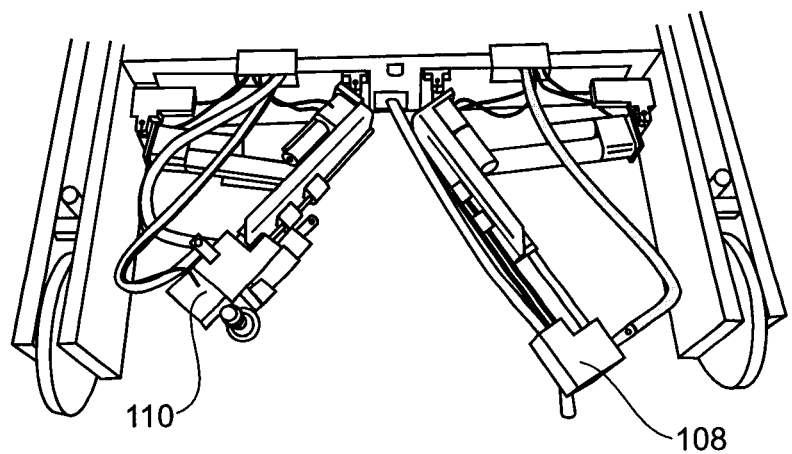

The movement of each of the arms 108, 110 in a polar layout (angular movement and extension/retraction) enables a wide range of operation of one arm while the other is in a resting position, as illustrated in FIGS. 3a to 3f. Furthermore, it enables maximizing the distance of the welding location—and welding spatter—from sensible equipment such as the cameras 136 and 140. FIGS. 3a to 3c illustrate the range of the extended grinding/camera arm 110 for grinding and inspecting, while the welding arm 108 is in the resting position. FIGS. 3d to 3f illustrate the range of the extended welding arm 108 for welding, while the grinding/camera arm 110 is in the resting position.

Figure 4:
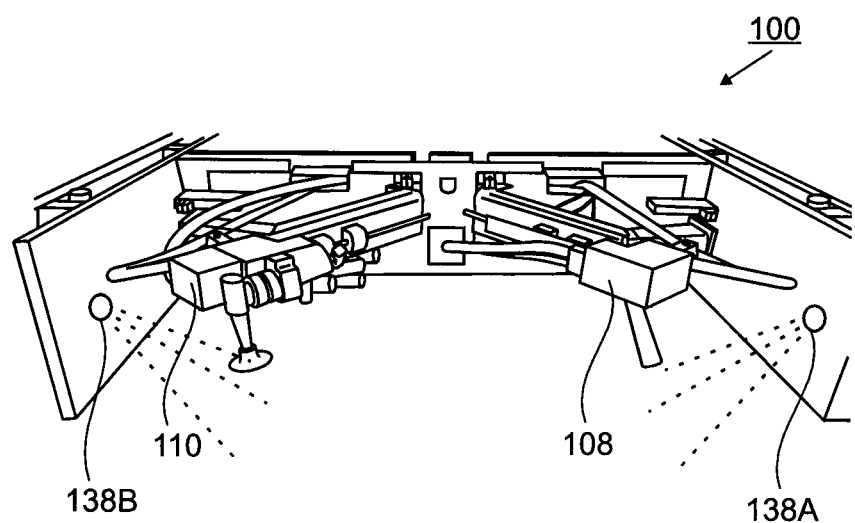
FIG. 4 is a simplified block diagram illustrating in a front perspective view the welding robot according to the preferred embodiment of the invention with light sources illuminating the work area.

FIG. 4 illustrates illumination of the working area using the lights 138A and 138B.

Figure 5:
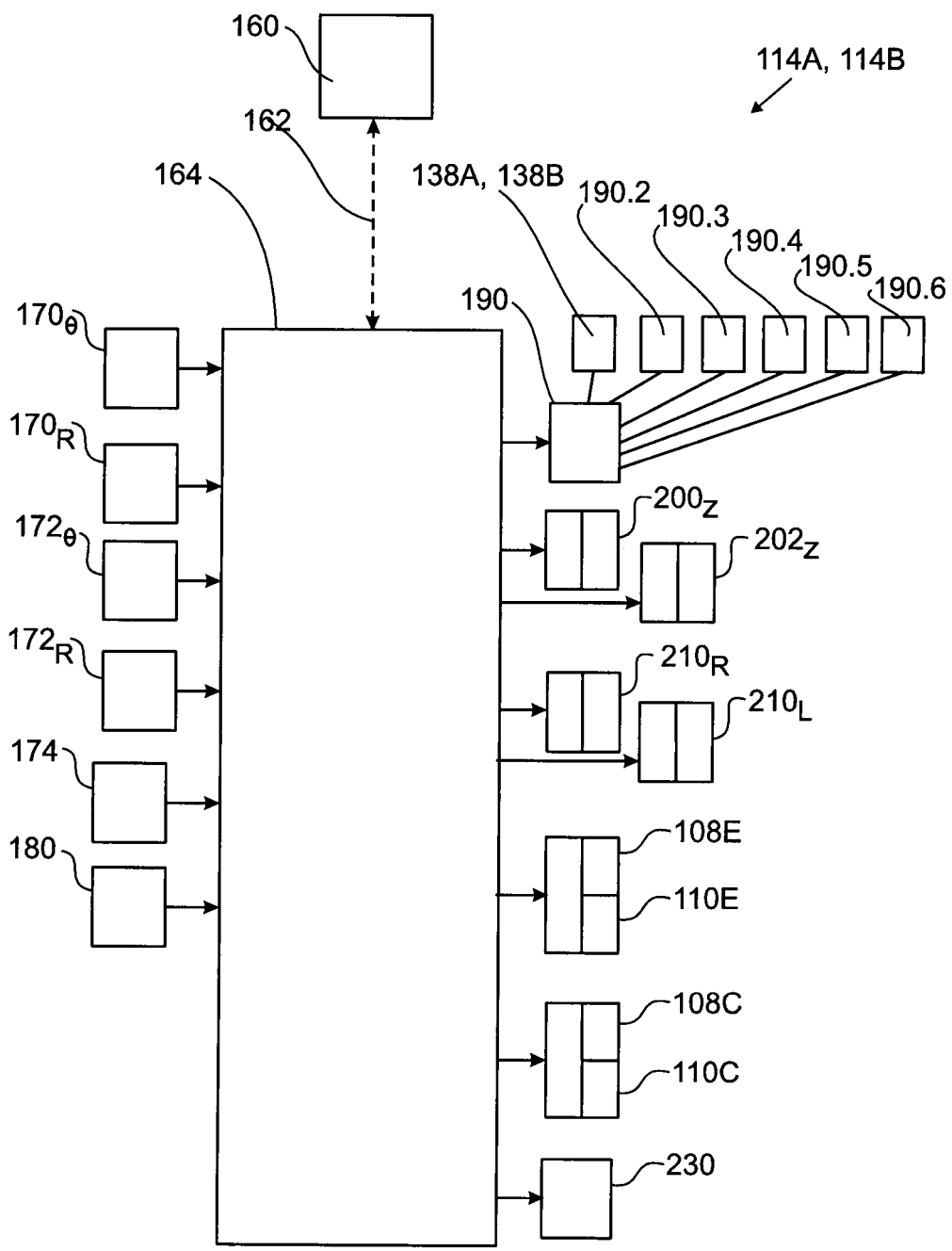
FIG. 5 is a simplified block diagram illustrating control elements of the welding robot according to the preferred embodiment of the invention.

FIG. 5 illustrates the control elements 114A, 114B according to a preferred embodiment of the invention of the welding robot 100. Onboard computer 164 is the electrical interface to all hardware drivers and sensors—except cameras. The onboard computer 164 comprises a commercially available Atmel SAM3X8E ARM Cortex-M3 microcontroller programmed in C using the Arduino IDE, but is not limited thereto and various other suitable microcontrollers may be used. The onboard computer 164 is in communication—preferably wireless—with remote computer 160, for example, a Linux computer, via communication link 162 such as, for example, a USB communication link or other low speed low latency communication link capable of transmitting data in 'real-time', i.e. with a latency of approximately 0.5 s or less. The communication link 162 carries a stream of bidirectional data, as indicated by the block arrow in FIG. 5, including transmitting incoming commands received from an operator of the welding robot 100 via a user interface of the remote computer 160, and sending sensor and telemetry data to the remote computer 160 for display on the user interface.

The onboard computer 164 is connected to the following sensors and drivers via—for example, a USB communication link in 'real-time', i.e. with a latency of approximately 10 ms or less—with the dataflow direction being indicated by block arrows in FIG. 5:

via analog to digital converter:
welding arm 108 angle sensor $170_\theta$ and grinding arm 110 angle sensor $172_\theta$
welding arm 108 radius sensor $170_R$ and grinding arm radius sensor $172_R$
welding shield gas pressure sensor 174
via digital inputs:
welding arm 108 and grinding arm 110 Z home limit switches 180
via relay control boards 190:
left LED 138A and right LED 138B
outrigger 106 air solenoid 190.2
cleaning air jet solenoid 190.3
grinder 128, 130 control solenoids 190.4
welder 122 remote relay 190.5
welding shield gas solenoid 190.6
via stepper motor drivers:
left and right wheel drive motors $210_L$, $210_R$
arm Z control motors $200_Z$, $202_Z$
via DC motor controllers:
welding arm radius motor 108E and grinding arm radius motor 110E s $220_R$ & $222_R$
welding arm angle motor 108C and grinding arm angle motor 110C s $220_\theta$ & $222_\theta$
welding wire feed 116 drive motor 230.

In the example implementation, the onboard computer 164 performs path and speed calculations to keep motors synchronized, reads sensors (both digital IO and Analog to Digital conversion), controls steps and step timing of stepper motors, controls relays, and PID compensation for motor control. Standard open source Arduino Stepper control libraries are used for the calculation of stepper motor timings and accelerations.

Preferably, the operation of the welding robot 100 is functionally divided into multiple software components with each software component controlling specific functions of the welding robot 100 associated therewith. Each of the software components is executed independently with the software components exchanging data by reading from and writing to commonly accessible data storage areas. Independently operating software components provide fault tolerance within the welding robot 100. For example, if a hardware component fails or the execution of a software component is unexpectedly interrupted, the remaining independently operating software components may still be able to carry out a repair to completion.

Figure 6A:
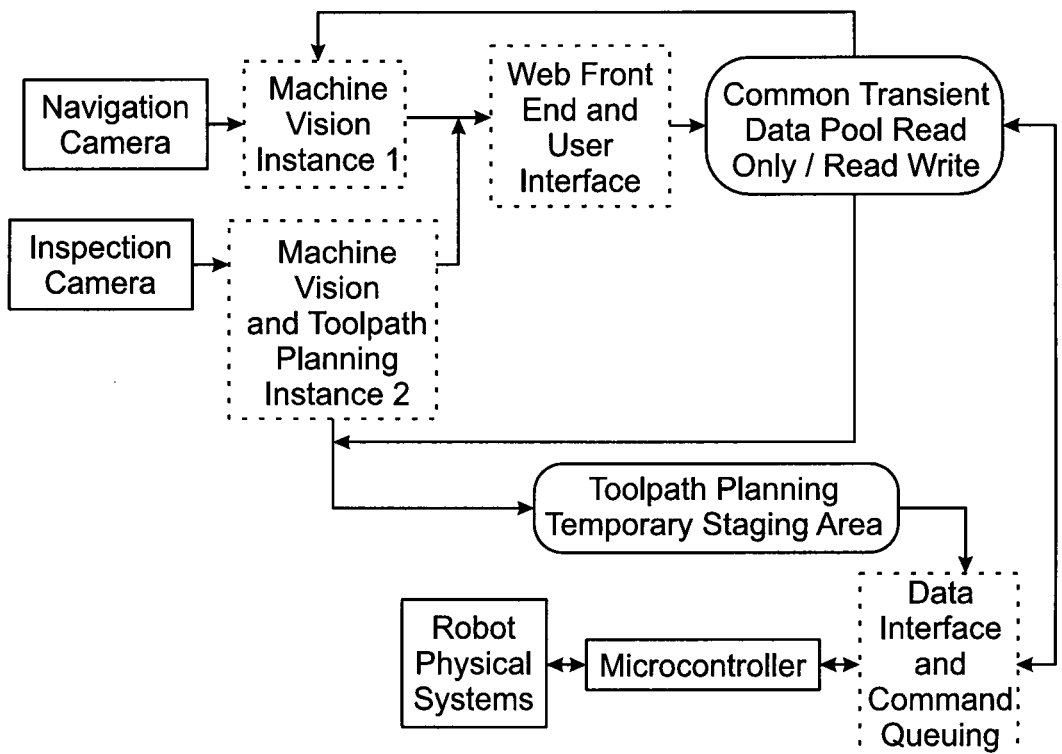
FIG. 6a is a simplified block diagram illustrating data flow for controlling the welding robot according to the preferred embodiment of the invention.

The software components are:
Microcontroller code
Web Front End and User Interface
Machine Vision Instance 1 Navigation
Machine Vision Instance 2 Inspection
Data Interface and Command Queuing The overall data flow between functional blocks is illustrated in FIG. 6a, with blocks referring to physical hardware components being indicated by solid lines, blocks referring to software components being indicated by dashed lines, and blocks referring to data storage having rounded corners.

Figure 6B:
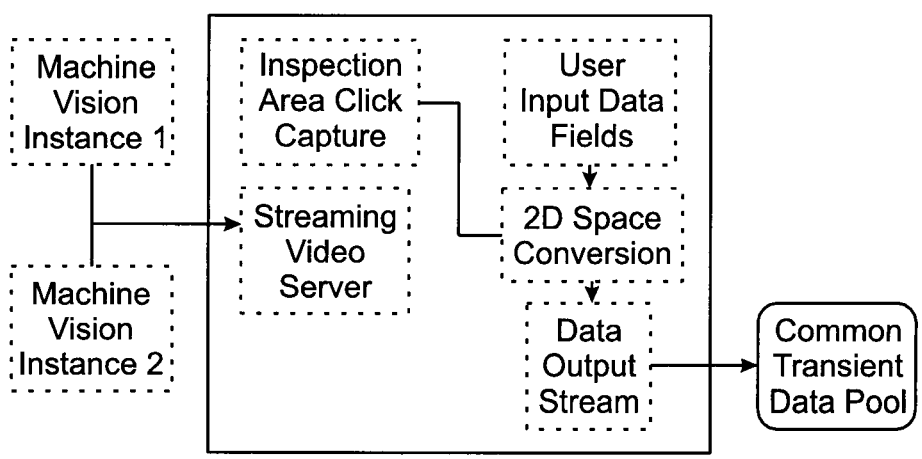

FIG. 6b illustrates a preferred software implementation of the web front end and user interface such as, for example, a browser-based Graphical User Interface (GUI), which is implemented on the remote computer 160 capable of rendering websites, such as, for example, a laptop computer or tablet computer. The user interface enables the operator to interact with the welding robot 100 with all controls required for normal operation being available through the user interface. The user interface software component is a separate and independent software component written, for example, in Python using the Python-Flask framework for web functionality and interaction. Clickable buttons, data fields and sliders are provided for interaction with the welding robot 100. Two viewing windows with live video from the two cameras—machine vision instance 1 and machine vision instance 2—are provided for operator visual feedback and inspection during operation via a streaming video server. The live camera stream from the navigation camera 136 (machine vision instance 1) is used for navigating the welding robot 100, while the live camera stream from the inspection camera 140 (machine vision instance 2) is used for repair area selection repair quality assessment by the operator. The Python code captures user click positions via user input data fields and performs 2D space conversion by calculating points in x-y coordinates relative to the welding robot frame in dependence upon user click position data. The captured user click positions are then saved to the common transient data pool for use by other software components.

Figure 6C:
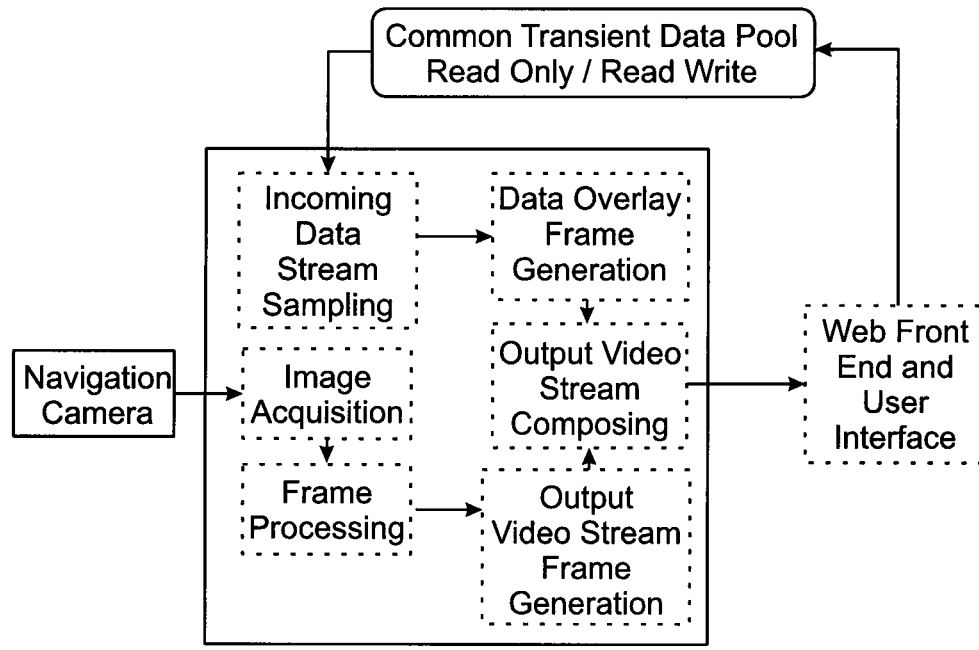

FIG. 6c illustrates a preferred software implementation of the machine vision instance 1 navigation. The front facing navigation camera 136 provides a live video stream to enable the operator to navigate and drive the welding robot 100 to a desired position. This software component is written in C++ and integrates OpenCV libraries for image manipulation, construction of frame matrices, construction of visual data overlays and integrating/combining data overlay and captured video frames. Raw frames from the navigation camera 136 are captured using OpenCV. Telemetry and sensor data are read from the common transient data pool using C++ standard file interaction libraries and are used to construct frame overlays to present the operator with data embedded in the video stream. Finished frames are constructed from live camera data and data overlays by compositing both frame matrices together using OpenCV. Finished frames are encoded using OpenCV imencode calls and are compressed with JPEG compression. The stream of JPEG compressed frames is passed to the streaming video server using standard Linux pipe redirection.

Figure 6D:
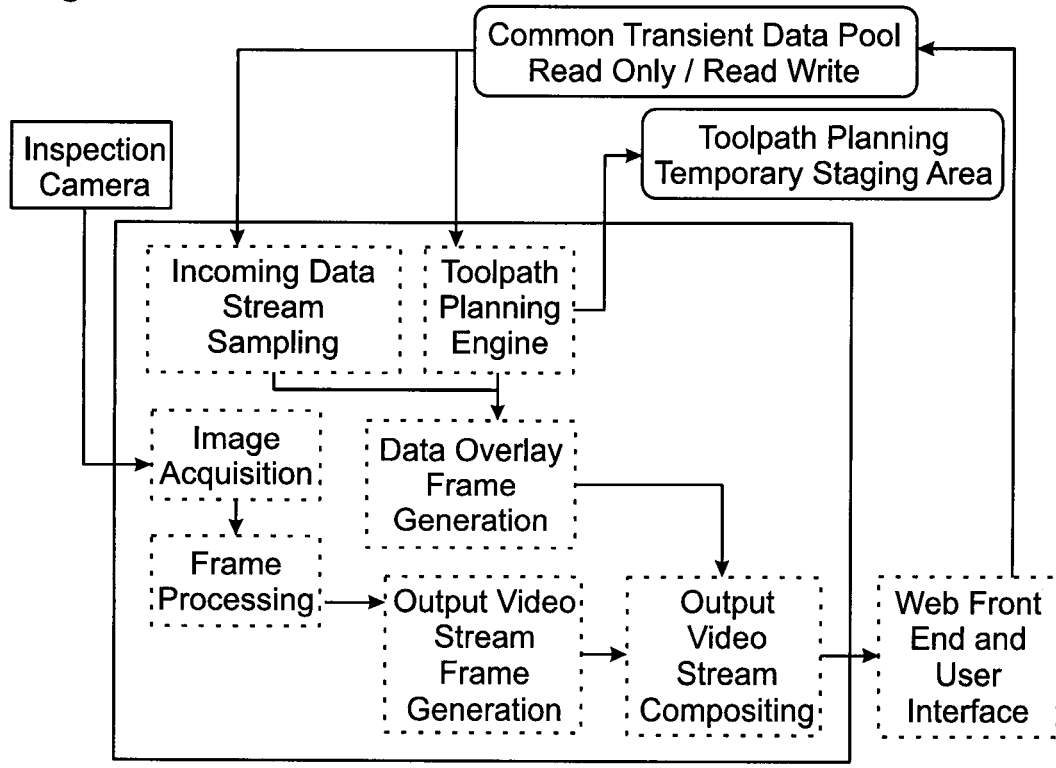

FIG. 6d illustrates a preferred software implementation of the machine vision instance 2 inspection. The downward facing inspection camera 140 provides a live video stream to enable the operator to perform detailed inspections of the steel surface, select repair areas, and assess the quality of a repair. This software component is written in C++ and integrates OpenCV libraries for image manipulation, construction of frame matrices, construction of visual data overlays and integrating/combining data overlay and captured video frames. Raw frames from the inspection camera 140 are captured using OpenCV. Telemetry and sensor data are read from the common transient data pool using C++ standard file interaction libraries and are used to construct frame overlays to present the operator with data embedded in the video stream. Click point frame data are read from the common transient data pool using C++ standard file interaction libraries. Both welding and grinding toolpaths are calculated dynamically as the user selects areas by adding click point data. A toolpath and selected area frame is generated using click point and toolpath data using openCV line( ) to draw line segments on a frame matrix. Finished frames (video, telemetry data and toolpath matrices) are composited together into a single frame matrix by combining all matrices together using OpenCV. Finished frames are encoded using OpenCV imencode( ) calls and are compressed with JPEG compression. The video stream of JPEG compressed frames is passed to the video server using standard Linux pipe redirection.

Toolpath planning for both welding and grinding is calculated dynamically. During operator area selection, a series of points is generated as the user clicks areas on the screen with the cursor. These cursor clicks are converted to absolute x-y coordinates. Connecting lines between all consecutive points are generated, as well as between the first and last click points. The connection of lines provides a closed loop around the user area selection. All points and lines are rendered to the screen as an overlay for operator visual feedback. Imaginary lines occupy all x-y space within the reach of the robot arms. The lines are parallel and run vertically, with a predefined separation between them (default is 4.5 mm). The intersection between these imaginary parallel lines versus the lines between user selection clicks are calculated. All imaginary line segments within the user selection area are captured. These line segments are written to a file in the 'toolpath planning and temporary staging area' data storage and used as the toolpath for welding and grinding.

Figure 6E:
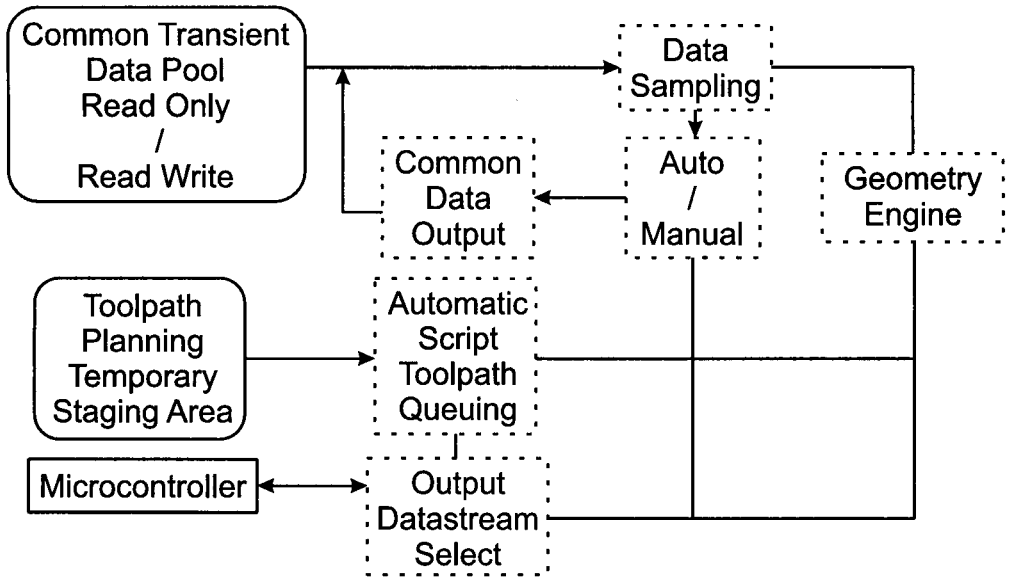

FIG. 6e illustrates a preferred software implementation of the data interface and command queuing. The data interface and command queuing program is written in C++ and is used to provide communication between the microcontroller of the onboard computer 164 and the common data areas—'common transient data pool and 'toolpath planning and temporary staging area'. The program reads and writes to the microcontroller using Arduino serial communication libraries. Microcontroller data are read from and written to /tmpfs for use by the other software components using standard C++ file interaction libraries. Two primary modes of operation are available, manual and automatic. During manual control the program reads user inputs and sends data directly to the microcontroller enabling operator control. All toolpath planning operations are ignored and only manual user controls are active. These user inputs are taken from the web front end and used to provide real time control of the movements of the welding robot 100, enabling navigation and fine control of the inspection camera 140 for positioning the welding robot 100. During automatic operation all user manual controls are ignored, and movements of the welding robot 100 during welding and grinding are controlled by the data stored in the 'toolpath planning and temporary staging area'. Each movement of either the welder 122 or grinder 128, originating from the toolpath planner, is executed in sequence until completion. Once the selected toolpath is completed—and corresponding welding or grinding has been completed—the robot switches from automatic control back to manual, enabling the operator to manually control the welding robot 100.

The user interface of the remote computer 160 is used to drive the welding robot 100 to a desired position within the press. The driving motion of the welding robot 100 is controlled through input of absolute position (in mm) or through manual fine adjustments using the user interface. These controls enable the operator to drive the welding robot 100 to a position for performing a repair, or to move the welding robot 100 to another location once a repair has been completed.

Figure 7A:
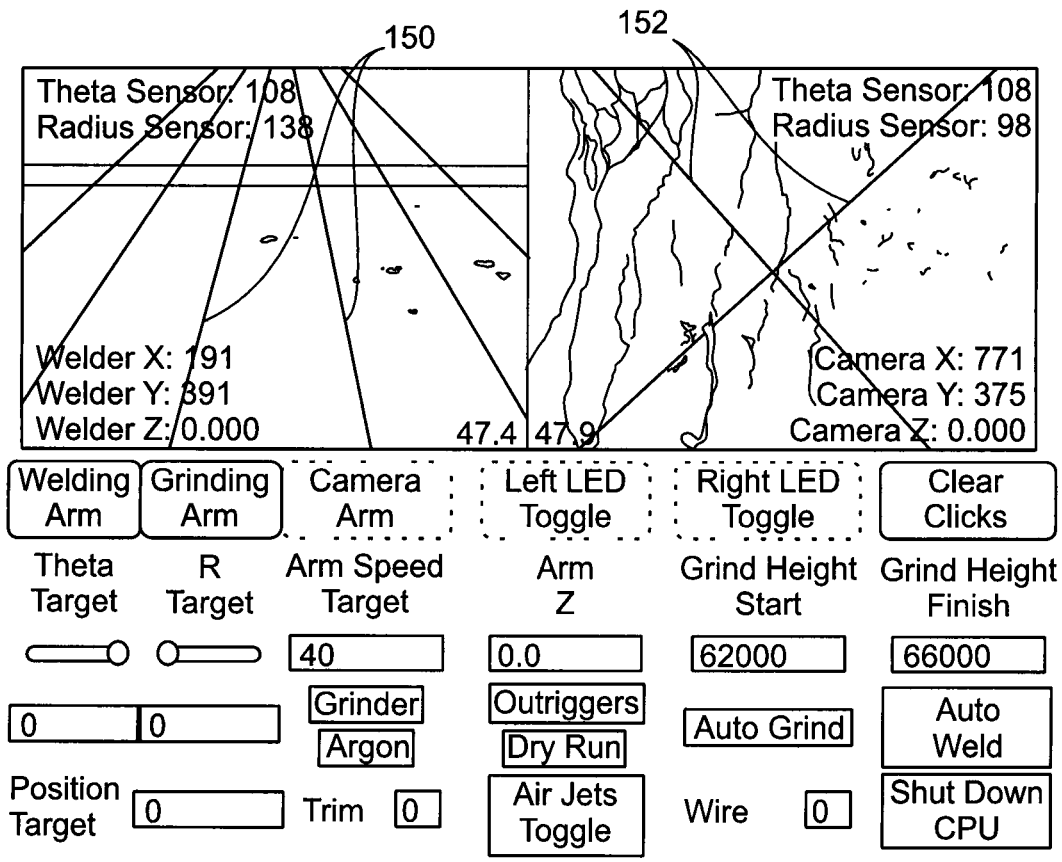
FIGS. 7a and 7b are simplified block diagrams illustrating screen shots of a user interface for operating the welding robot according to the preferred embodiment of the invention.

The left-hand side image in FIG. 7a illustrates a navigation view "Position Target" field taken by the navigation camera 136 with equidistant spaced parallel lines 150 for facilitating navigation of the welding robot 100. For example, for navigation the operator provides absolute position data or performs fine adjustments using the user interface. The location is absolute, i.e. when the operator wants to come back to this position, he provides the command to go to "0". The control software knows this position through dead reckoning.

Once the welding robot 100 has been driven to a desired position within the press, the user adjusts the grinding/inspection camera arm 110 over the desired defect using the slider and data field inputs of the user interface. After the grinding/inspection camera arm 110 is placed over the desired defect the outriggers 106 are deployed for securing the welding robot 100 in place.

The right-hand side image in FIG. 7a illustrates an inspection view taken by the inspection camera 140 with perpendicular coordinate lines 152 at a desired location. Height/depth of a defect is determined using a method similar to stereophotogrammetry. The stereophotogrammetry scanning process is based on the difference in the angle light is hitting the defect when the light source 138A, 138B is near or further away, resulting in a difference in the shadows from which height/depth can be inferred. Therefore, a defect can be inspected and its height/depth be inferred by illuminating the same with only the light source 138A followed by illuminating the same with only the light source 138B.

Figure 7B:
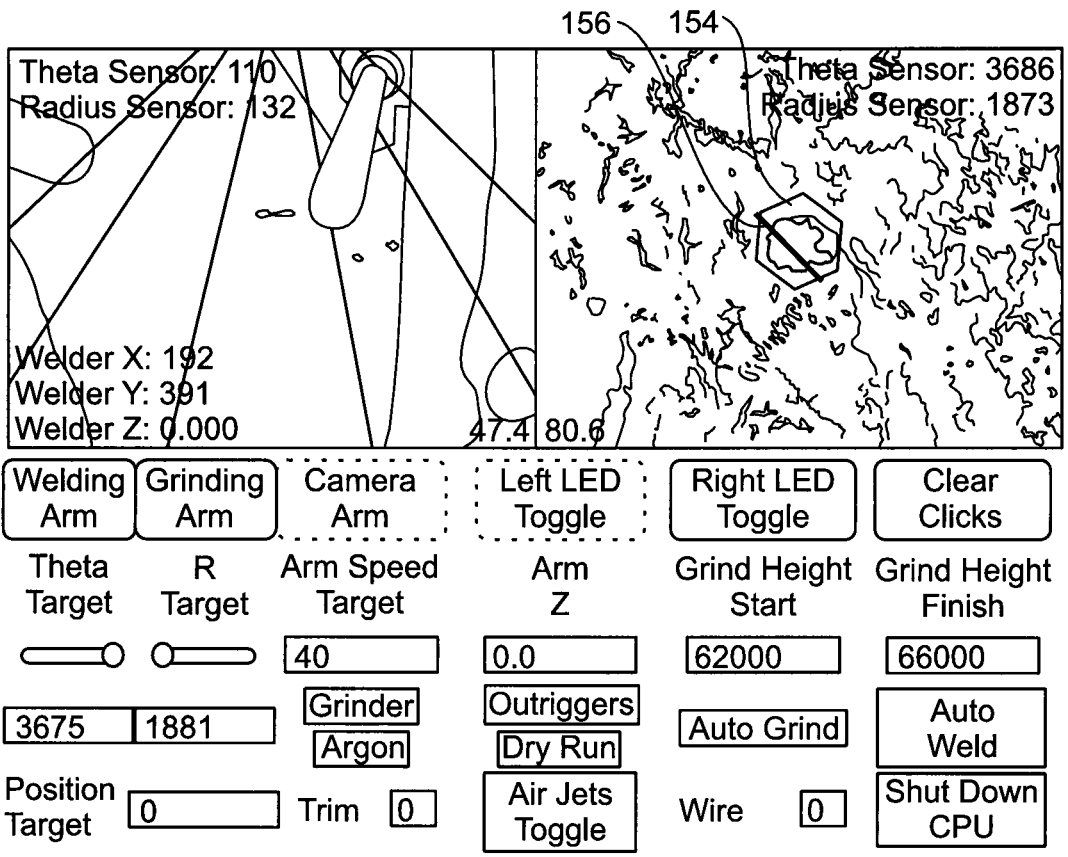
Figure 8:
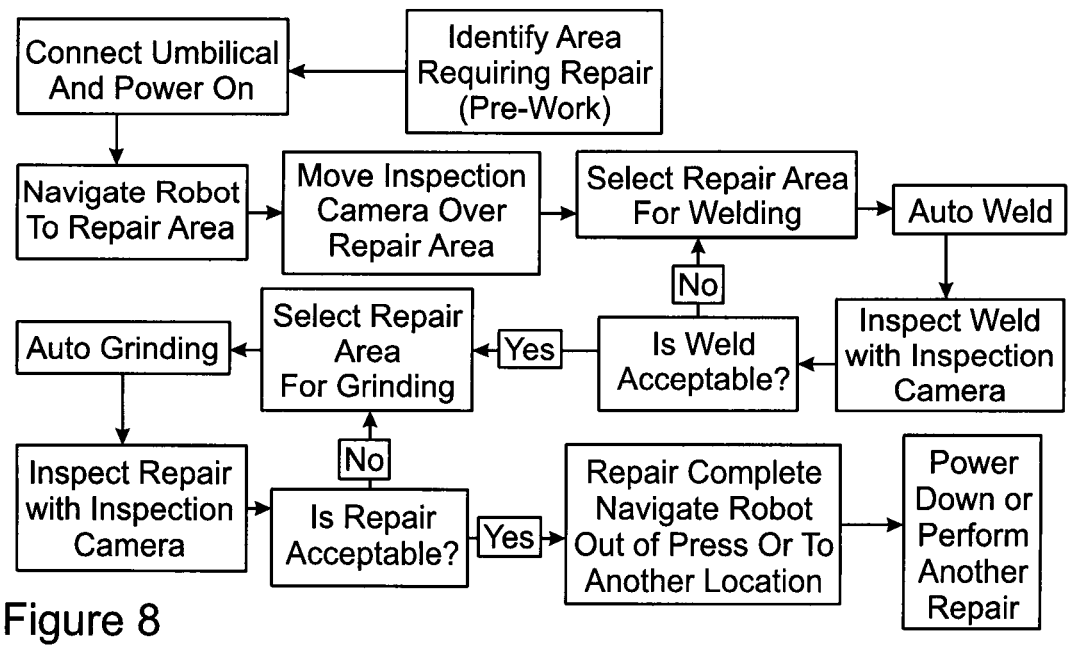
FIG. 8 is a simplified block diagram illustrating an example repair workflow during normal operation of the welding robot according to the preferred embodiment of the invention.

Once the inspection camera 140 has the defect within view, the operator outlines the desired repair 154 area around the defect, as illustrated in FIG. 7b. This area selection automatically generates a toolpath 156 which is then displayed on the user interface as an overlay on the inspection camera video. The operator then clicks "Auto Weld" to begin the automated repair process. When automatic mode is selected (either welding or grinding) manual controls are locked out and the welding robot 100 automatically performs the repair. Once welding has been completed, the operator inspects the weld with the inspection camera 140 to ensure it is acceptable. The operator then selects the area for grinding, then clicks "Auto Grind" to complete the repair. Once grinding has been completed, the operator inspects the grinded weld with the inspection camera 140 to ensure it is sufficiently flat. An example repair workflow during normal operation of the welding robot 100 including the above described steps is illustrated in FIG. 8.

Referring to FIGS. 9a to 9g a welding robot 300 according to another preferred embodiment of the invention is provided. The welding robot 300 comprises same or similar components as the welding robot 100 described hereinabove and is operated in a similar fashion with the different features illustrated in FIGS. 9a to 9g and described hereinbelow. Front wheels 304A are rotatably mounted to a front portion of the support frame in a conventional manner using, for example, commercially available bearings. Each of the front wheels 304A is driven by a respective wheel drive, such as, for example, a stepper motor, enabling independent drive operation of the front wheels 304A for enabling steering of the welding robot 300. Preferably, rear wheel 304B, mounted to a rear portion of the support frame, is enabled to swivel about a vertically oriented axis to facilitate steering of the welding robot 300. For example, the rear wheel 304B is a conventional swivel caster.

Riggers 306 are mounted to the support frame, for example, three riggers 306 in proximity to the three wheels 304A, 304B. Each of the riggers 306 is telescopically extendable in an upward direction for securing the welding robot during welding and grinding.

Welding tool 322, grinding tool 328, and inspection camera 340 are mounted to a single tool arm assembly. The tool arm assembly comprises tool arm 308A which is rotatable mounted in a conventional, for example, hinge type, manner at pivot 309 to arm support 307 mounted to the support frame at the front of the welding robot 300. The tool arm 308A is rotatably actuated in a similar fashion as the welding arm 108 and the grinding arm 110 described hereinabove using linear actuator 308B driven by, for example, a servomotor and gear mechanism. Furthermore, the tool arm 308A is telescopically extendable/retractable in a similar fashion as the welding arm 108 and the grinding arm 110 described hereinabove with tool arm extension 308C being driven by, for example, a servomotor and gear mechanism. The welding tool 322, grinding tool 328, and inspection camera 140 are mounted to the tool arm extension 308C via tool head 308D. This arrangement enables movement of the welding tool 322, grinding tool 328, and inspection camera 340 in a polar layout (angular movement and extension/retraction) as indicated by the block arrows in FIG. 9a.

In order to enable vertical adjustment of the welding tool 322 and the grinding tool 328 the same are mounted to the tool head 308D via respective vertical adjustment mechanisms 321 and 327. The vertical adjustment mechanisms 321 and 327 are implemented in a conventional manner using, for example, guide rails, and are actuated using, for example, commercially available stepping motors for precise vertical adjustment, as indicated by the block arrows in FIG. 9b. Preferably, the vertical adjustment mechanisms 321 and 327 are designed to enable vertical adjustment between a low position and high position of the respective tool in a range between 20 mm and 50 mm. It is noted that a larger distance such as, for example, 50 mm, between the low position and high position of the respective tool enables changing of the grinding disk or maintenance of the welding nozzle, as well as reduces obstruction of the inspection camera view by the grinding disk and the welding nozzle.

Navigation of the welding robot 300 is facilitated using forward-facing navigation camera 336, for example, a commercially available digital camera. Preferably, the navigation camera 336 is placed at the center top of the front of the welding robot 300 and aims slightly down to provide a view of the work surface.

For illuminating the working area light sources 338A and 338B such as, for example, conventional LED lights emitting while light are disposed in the front of the welding robot 300 in proximity to the bottom left and right end with the same being adapted for emitting light beams oriented forwardly towards the center. The light sources 338A and 338B are used to successively illuminate a surface area for determining height/depth of a defect located in the surface area based on stereophotogrammetry. Alternatively, the lights sources 338A and 338B emit light of two different primary colors such as, for example, red and green, simultaneously. For determining height/depth of a defect the separate images, each associated with a different primary color, provided by the digital inspection camera 340 are then processed as separate images in the stereophotogrammetry process. Optionally, a third light source emitting light of the third primary color is placed at the center bottom of the front of the welding robot 300, thus providing three separate images of the surface area for the stereophotogrammetry process.

Figure 9A:
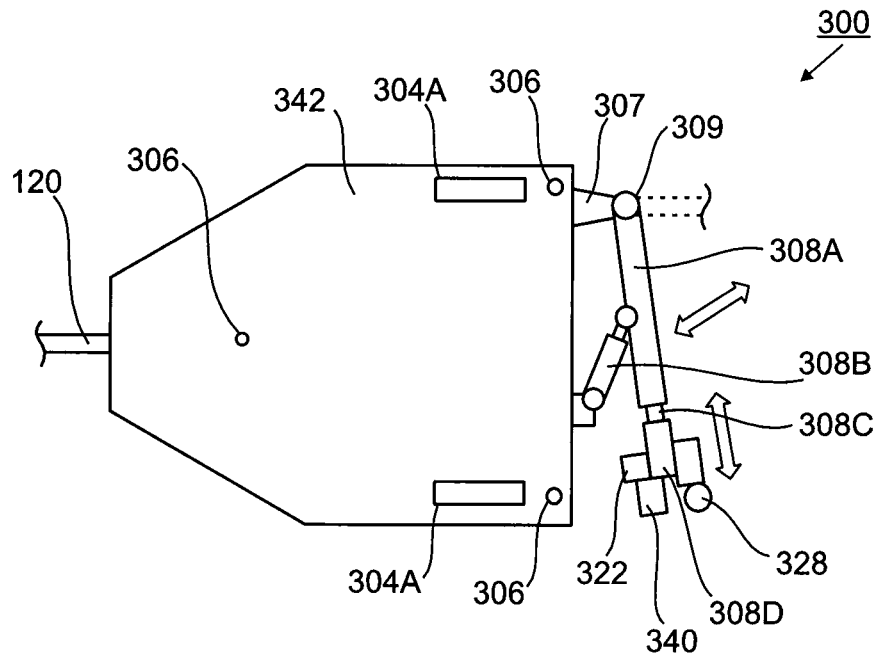
FIGS. 9a to 9c are simplified block diagrams illustrating in a top view, a side view, and a front view, respectively, a welding robot according to another preferred embodiment of the invention.
Figure 9B:
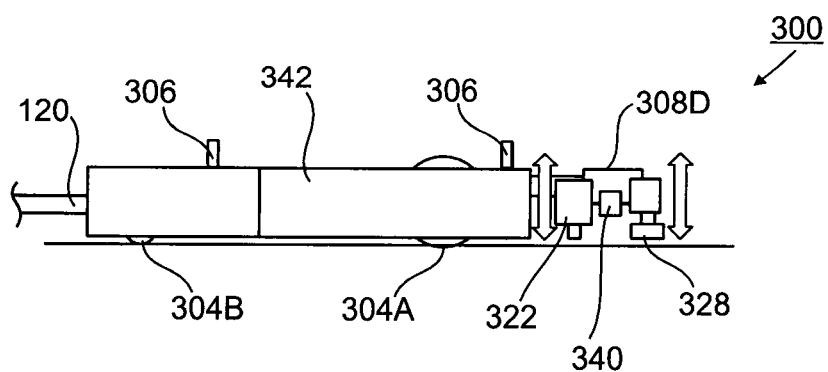
Figure 9C:
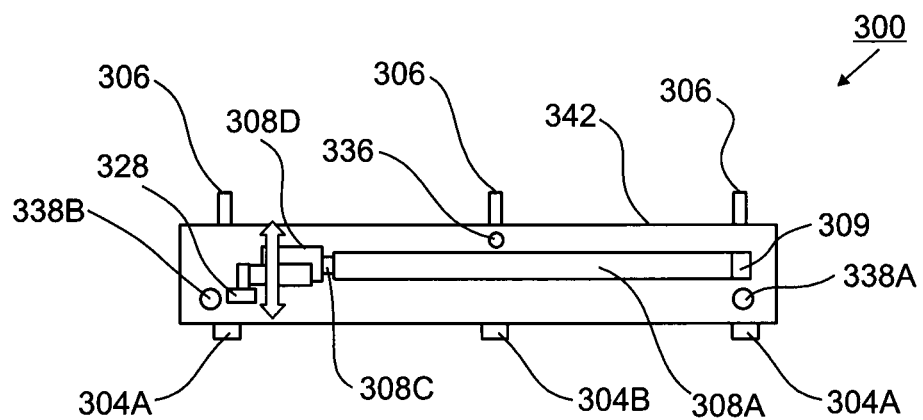
Figure 9D:
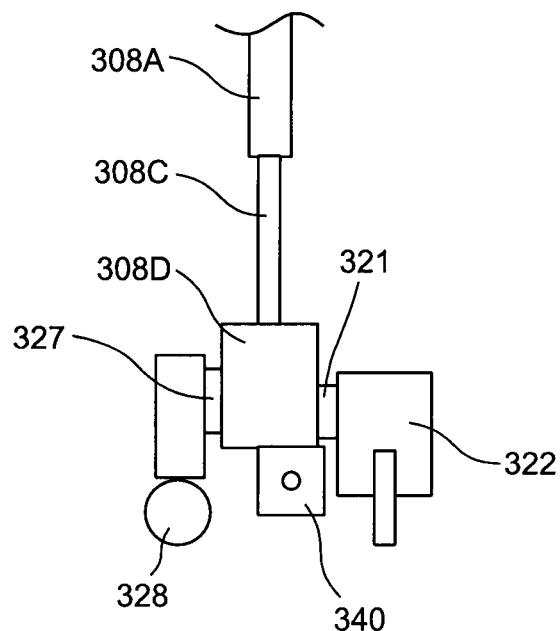
FIG. 9d is a simplified block diagram illustrating in a bottom view a tool head of the welding robot according to the other preferred embodiment of the invention.
Figure 9E:
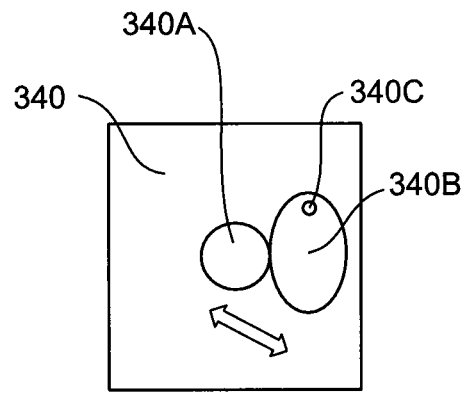
FIGS. 9e and 9f are simplified block diagrams illustrating in a bottom view a protective cover plate of the inspection camera of the welding robot according to the other preferred embodiment of the invention with the protective cover plate being in an open and a closed position, respectively; and, FIG. 9g is a simplified block diagram illustrating in a top view the welding robot according to the other preferred embodiment of the invention with a protective cover for transport and storage.
Figure 9F:
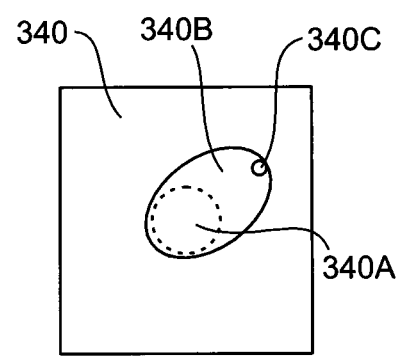

The inspection camera 340 comprises a downward facing digital camera disposed in a housing having an aperture 340A in a bottom wall thereof. Due to the close proximity of the inspection camera 340 to the welding tool 322 and the grinding tool 328 the camera lens is, preferably, protected from grinding sparks and welding spatter using cover plate 340B made of, for example, sheet metal. The cover plate 340A is, for example, rotatable movable mounted to the bottom wall of the camera housing at pivot 340C between an open position for enabling imaging and a closed position for protecting the camera lens, as indicated by the block arrow in FIG. 9e. During welding and grinding the cover plate 340B is in the closed position for protecting the camera lens by covering the aperture 340A, as illustrated in FIG. 9f. Movement of the cover plate 340B is actuated using, for example, a conventional stepper motor.

Figure 9G:
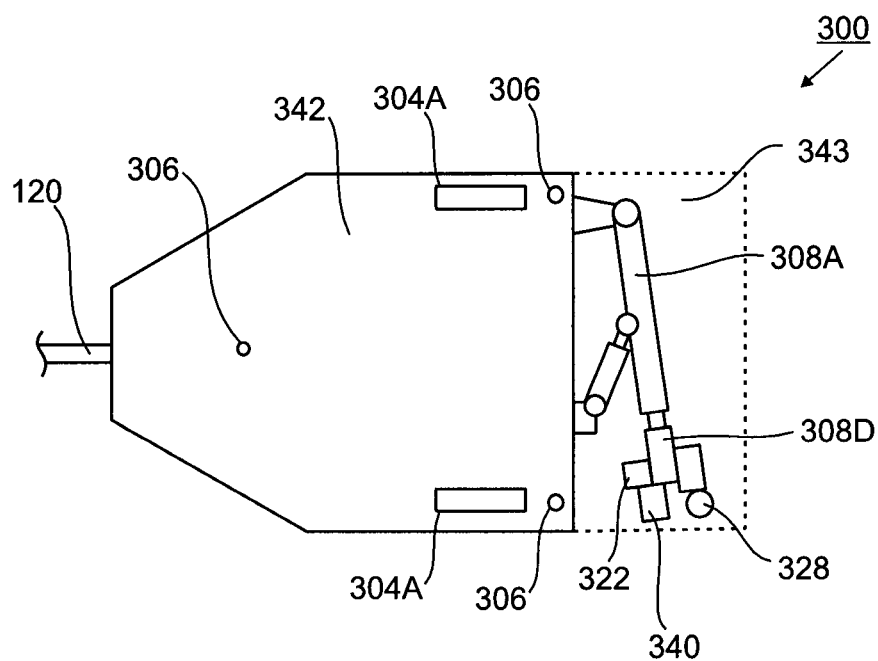

Preferably, the welding robot 300 comprises a protective cover 343 for protecting the welding tool 322, the grinding tool 328 and the cameras 336 and 340 during transport and storage of the same, as illustrated in FIG. 9g. The protective cover 343 is made of, for example, sheet metal, and is removable/re-attachable mounted to the front of the welding robot 300 using conventional fasteners such as, for example, screw fasteners or clip fasteners.

Optionally, the tool head 308D is rotatably mounted to the tool arm extension 308C such that the welding tool 322, the grinding tool 328, and the inspection camera 340 are facing downward in a first mode for repairing the lower platen and upward for repairing the upper platen. For example, the tool head 308D and the tool arm extension 308C each comprise a respective connecting element which can be mounted together in two opposite orientations. For example, the connecting elements are flanges which can be mounted together using screw bolts and screw nuts. In order to enable operation with the welding tool 322, the grinding tool 328, and the inspection camera 340 facing upward for repairing the upper platen a second navigation camera is placed at the center bottom of the front of the welding robot 300 and aims slightly up to provide a view of the work surface of the upper platen. Furthermore, two additional light sources are disposed in proximity to the top left and right end with the same being adapted for emitting light beams oriented forwardly towards the center for illuminating the work area on the upper platen.

It is noted that the welding robots 100 and 300 may also be employed at temperatures below the operating temperature of the press such as, for example, room temperature.

The present invention has been described herein with regard to preferred embodiments. However, it will be obvious to persons skilled in the art that a number of variations and modifications can be made without departing from the scope of the invention as described herein.

The invention claimed is:

1. A welding robot adapted for operating in the space between an upper and a lower platen of a press comprising:
   a support frame;
   a welding tool movable mounted to the support frame;
   a grinding tool movable mounted to the support frame;
   at least a camera adapted for capturing a view of a working area;
   at least two light sources disposed such that light emitted from the light sources is hitting the working area at different angles, the light sources being adapted for emitting light successively or for emitting light of different primary colours for enabling determination of height or depth of a defect; and,
   a processor adapted for executing executable commands stored in a storage medium connected thereto, the processor when executing the commands performing:
   identifying defects on a surface of one of the upper and the lower platen based on image data received from the at least the camera;
   determining height or depth of the defects by processing the image data using stereophotogrammetry, the image data being indicative of the working area being illuminated from the at least two light sources; and,
   controlling the welding tool and the grinding tool in dependence on the image data; a housing made of a heat protecting sheet material disposed on an outside of the support frame;
   one or more arms extending from the housing; and,
   a pressurized air-cooling system for distributing pressurized air for cooling within the housing and the one or more arms, wherein the housing and the air-cooling system are adapted for enabling operation of the welding robot in a temperature range of 200° C.-250° C.

2. The welding robot according to claim 1 wherein the at least the camera comprises a downward facing inspection camera, wherein the welding tool, the grinding tool, and the downward facing inspection camera are mounted to a single arm of the one or more arms extending from the housing, wherein the single arm is pivotally movable mounted to the support frame and is telescopically extendable/retractable, and wherein the welding tool and the grinding tool are vertically adjustable.

3. The welding robot according to claim 1 comprising telescopically extendable riggers for securing the welding robot during welding and grinding.

4. The welding robot according to claim 1 wherein the robot is adapted for repairing the surface of the lower and the upper platen.

5. The welding robot according to claim 4 wherein the robot is adapted for operating upside down.

6. The welding robot according to claim 1 wherein the at least the camera comprises a forward-facing navigation camera and a downward-facing inspection camera.

7. The welding robot according to claim 6 comprising at least two light sources for illuminating the working area from different directions.

8. The welding robot according to claim 6 wherein the downward facing inspection camera comprises a protection for protecting the same from welding spatter and grinding sparks.

9. A process for repairing a defect in a surface of one of an upper and a lower platen of a press comprising: providing the welding robot of claim 6, adapted for operating in the space between the upper and the lower platen, wherein the processor comprises an onboard processor;
using the forward-facing navigation camera moving the welding robot to a predetermined location;
using the downward-facing inspection camera capturing a view of the working area at the predetermined location;
using the at least two light sources of the welding robot disposed such that light emitted from the light sources is hitting the working area at different angles, emitting the light successively or emitting the light of different primary colours for enabling determination of height or depth of the defect; and,
using the onboard processor and a remote processor adapted for executing executable commands stored in a respective storage medium connected thereto, the processors when executing the commands performing:
identifying the defect based on the image data received from the downward-facing inspection camera;
determining the height or the depth of the defects by processing the image data using the stereophotogrammetry, the image data being indicative of the working area being illuminated from the at least two light sources; and,
repairing the defect by controlling the welding tool and the grinding tool of the welding robot in dependence on the image data;
wherein the operation performed by the processors is divided into multiple independently executed components, the components being:
microcontroller code;
web front end and user interface;
machine vision instance 1-navigation;
machine vision instance 2-inspection; and,
data interface and command queuing; and,
wherein the components exchange data by reading from and writing to commonly accessible data storage.

10. The process according to claim 9 wherein the processors perform:
receiving data indicative of a repair area;
automatically determining toolpath data for welding and grinding in dependence upon the data indicative of the repair area; and,
generating and providing control data for controlling the welding tool and the grinding tool in dependence upon the toolpath data.

11. The process according to claim 9 comprising:
using at least two light sources for illuminating the working area from different directions;
using the downward-facing inspection camera for viewing the working area; and,
using the processor comprising the onboard processor for determining height or depth of a defect located in the surface based on the stereophotogrammetry.

12. The process according to claim 11 wherein the light sources emit white light successively.

13. The process according to claim 11 wherein the light sources emit light of different primary colors simultaneously.

14. The process according to claim 9 comprising:
capturing user click positions from the user interface;
performing 2D space conversion by calculating points in x-y coordinates relative to the welding robot in dependence upon the user click positions; and,
storing data indicative of the user click positions in the commonly accessible data storage.

15. The process according to claim 14 comprising:
determining a repair area in dependence upon the user click positions;
determining a plurality of parallel lines covering the area, the parallel lines being placed a predetermined distance apart; and,
storing data indicative of the parallel lines in the commonly accessible data storage.

16. The process according to claim 15 comprising:
moving the welding tool in dependence upon the data indicative of the parallel lines; and,
moving the grinding tool in dependence upon the data indicative of the parallel lines.

17. The process according to claim 9, wherein one of the one or more arms carries the welding tool and another of the one or more arms carries the grinding tool, and wherein controlling the welding tool and the grinding tool comprises controlling movement of the arm having the welding tool and the arm having the grinding tool mounted thereto, the movement comprising pivotal movement of each arm and telescopic extension/retraction of each arm.

18. The process according to claim 17 wherein controlling the welding tool and the grinding tool further comprises controlling vertical movement of the welding tool and the grinding tool with respect to each arm.

* * * * *